United States Patent [19]
Suita et al.

[11] Patent Number: 5,744,728
[45] Date of Patent: Apr. 28, 1998

[54] ROBOT COVERED WITH VISCO-ELASTIC MATERIAL

[75] Inventors: Kazutsugu Suita, Toyota; Yoji Yamada, Nagoya; Nuio Tsuchida, Nagoya; Koji Imai, Nagoya, all of Japan

[73] Assignee: Toyota Jidosha Kabushiki Kaisha, Toyota, Japan

[21] Appl. No.: 746,582

[22] Filed: Nov. 12, 1996

Related U.S. Application Data

[63] Continuation of Ser. No. 489,427, Jun. 12, 1995, abandoned.

[30] Foreign Application Priority Data

Jun. 28, 1994 [JP] Japan ................... 6-146685

[51] Int. Cl.$^6$ ............................................. G05B 19/42
[52] U.S. Cl. ............................. 73/862.542; 901/49
[58] Field of Search ........................ 73/865.7, 862.542; 901/9, 46, 49

[56] References Cited

U.S. PATENT DOCUMENTS

| | | |
|---|---|---|
| 4,591,944 | 5/1986 | Gravel . |
| 4,634,107 | 1/1987 | Vandersyde et al. . |
| 4,641,251 | 2/1987 | Inoue . |
| 4,685,349 | 8/1987 | Wada et al. . |
| 4,696,501 | 9/1987 | Webb . |
| 4,762,007 | 8/1988 | Gasperi et al. . |
| 5,232,241 | 8/1993 | Knott et al. . |
| 5,363,474 | 11/1994 | Sarugaku et al. . |
| 5,439,735 | 8/1995 | Jamison . |
| 5,493,192 | 2/1996 | Nihei et al. . |

FOREIGN PATENT DOCUMENTS

| | | |
|---|---|---|
| 2 595 441 | 9/1987 | France . |
| 2 659 259 | 9/1991 | France . |
| A-61-270095 | 11/1986 | Japan . |
| A-62-50906 | 3/1987 | Japan . |
| A-1-230107 | 9/1989 | Japan . |
| A-2-59291 | 2/1990 | Japan . |
| A-5-208394 | 8/1993 | Japan . |

*Primary Examiner*—Robert Raevis
*Attorney, Agent, or Firm*—Oliff & Berridge, PLC

[57] ABSTRACT

It is difficult to use in combination a technique of detecting a collision of an arm due to application thereto of an external force and a technique of alleviating the degree of impact of the arm by covering the arm with a cushioning material. This is so because if it is intended to alleviate the impact degree, the timing of detection of the generation of the collision is delayed. The disclosed technique is to overcome the relation of the opposing factors by using a visco-elastic material. Particularly, by selecting the viscosity coefficient and the elasticity coefficient of the material in predetermined ranges, it is possible to alleviate the impact degree without excessive delay of the impact detection timing and forcibly stop the arm before the force acting between the arm and the object exceeds a permissible level.

1 Claim, 6 Drawing Sheets

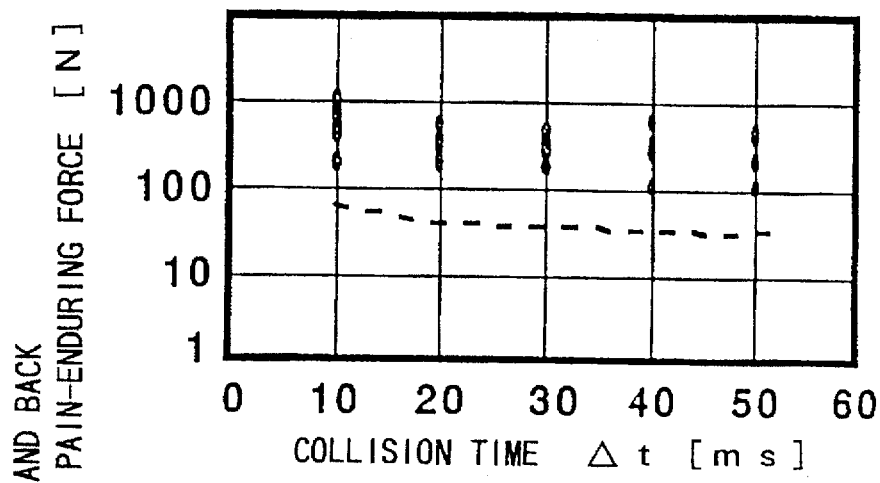
FIG.7
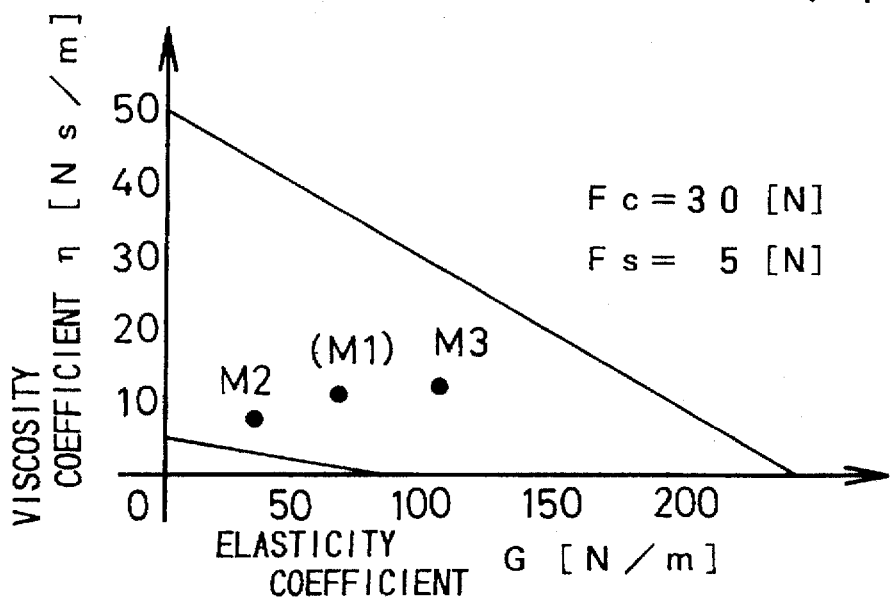
FIG.8
|  | G [N/m] | η [Ns/m] |
|---|---|---|
| (M1):MAN'S FINGER | 56.56 | 12.70 |
| M2:URETHANE FOAM | 29.63 | 8.04 |
| M3:SILICON GEL | 98.62 | 13.76 |
FIG.9

ROBOT COVERED WITH VISCO-ELASTIC MATERIAL

This is a Continuation of application Ser. No. 08/489,427 filed Jun. 12. 1995, now abandoned.

BACKGROUND OF THE INVENTION

1. Field of the Invention

This invention relates to a robot with a safety device which detects the magnitude of external force applied to its arm and which forcibly stops an arm driver such as a motor for causing rotation of the arm when the detected magnitude of external force exceeds a predetermined level.

2. Description of the Prior Art

To detect the contact of an unexpected object with a robot arm, there are various attempts using optical sensors, hair sensors made of shape memory alloys, proximity switches, etc. As one such attempt, a system for detecting the magnitude of external force applied to the arm has been proposed. Examples of the system are disclosed in Japanese Laid-Open Patent Publication No. 2-59291, Japanese Laid-Open Patent Publication No. 62-50906, Japanese Laid-Open Patent Publication No. 61-270095, Japanese Laid-Open Patent Publication No. 1-230107, and Japanese Laid-Open Patent Publication No. 5-208394. This system for detecting the magnitude of external force permits simplification in construction compared to the cases of utilizing other sensors.

In the technique disclosed in Japanese Laid-Open Patent Publication No. 2-59291, as shown in FIG. 1, as a motor 1 for causing rotation of a robot arm 2, a torque motor in which the torque produced and the drive current are proportional is used. The drive current flowing in the motor 1 is monitored while the arm 2 is driven according to position data, for instance. If the monitored current level is changed suddenly, it is determined to be due to a collision of the arm 2 with an object 3. When the collision is detected, the motor 1 is forcibly stopped.

When the arm 2 may collide with the object 3, it is expected that the degree of impact can be alleviated by covering the surface of the arm 2 with a cushioning material such as sponge. This is shown in Japanese Laid-Open Patent Publication No. 61-270095. Although this system can of course fulfill its aim, it is difficult to adopt the system in combination with the technique of detecting a collision through detection of the applied external force. With the use of a cushioning material for alleviating the impact degree, the external force that is detected is reduced in an initial stage of the collision. Consequently, the collision detection timing is delayed. Furthermore, a certain delay of response after the collision detection is inevitably produced until the arm 2 is stopped. With a delay of the collision detection timing, the timing when the arm 2 is stopped is also delayed. During this delay time, the force with which the object 3 is pushed by the arm 2 is increased even though the arm 2 is covered with a cushioning material. Therefore, it is difficult to adopt in combination the technique of urgently stopping the arm through detection of external force applied to the arm and the technique of alleviating the impact degree by covering the arm outer surface with a cushioning material.

SUMMARY OF THE INVENTION

The invention seeks to realize a technique which can overcome the above technical relation of opposing factors and permits detection of the generation of a collision in as early timing as possible while alleviating the impact degree of the collision.

In one aspect of the invention, in a robot which detects the magnitude of external force applied to an arm and which forcibly stops an arm driver when the detected magnitude of external force exceeds a predetermined level, the surface of the arm is covered with a visco-elastic material.

With the provision of the visco-elastic material cover on the arm surface, the impact degree when the arm collides with an object can be alleviated. In this case, the detected external force is again reduced in an initial stage of collision. However, when the cover is not made of a mere elastic material but is made of a material having visco-elasticity, the external force detected in an initial stage of collision is comparatively quickly increased. Thus, it is possible to detect generation of a collision at an early timing with a system which is for detecting the applied external force. Meanwhile, in a latter stage of collision, the impact degree is alleviated mainly by the viscosity. Thus, the external force is not excessively increased during the delay time that may be produced between the collision detection and the stopping of the arm.

In the case of the robot as mentioned above, the visco-elastic material suitably has a viscosity coefficient and an elasticity coefficient in respective ranges such that the force acting thereon is less than a permissible level at an instant after lapse of the sum of times t1 and t2, time t1 being from the instant when the material is brought into contact with an object till the instant of reaching of the predetermined level of the force acting on the material, time t2 being from the instant of starting the operation of the forcible stopping the driver till the instant when the arm is stopped. This condition is affected by the speed of the arm, etc. In many cases, however, there exists a visco-elastic material with the viscosity and elasticity coefficients meeting the above condition.

If the above condition is satisfied, a collision is detected in a short period of time from the timing of the start of application of external force on the visco-elastic material. Thus, the arm can be stopped before an external force in excess of the permissible level turns to act between the object and the arm via the visco-elastic material even if a response delay is produced until the robot arm is stopped after the forced stopping means has been started. It is thus possible to prevent damage to the object or arm due to a collision therebetween. Particularly, by setting the permissible level noted above to be below the pain-enduring force of a man, the man can safely work together with the robot because the robot arm is stopped before the man can no longer endure ache due to contact of the arm with him or her.

BRIEF DESCRIPTION OF THE DRAWINGS

The above and other objects, features and advantages of the invention will become more apparent from the detailed description of the preferred embodiment thereof when the same is read with reference to the accompanying drawings, in which:

FIG. 7 is a graph showing pain-enduring force on the back of a man's hand;

FIG. 8 is a graph showing the ranges of viscosity coefficient n and elasticity coefficient G used in the embodiment;

FIG. 9 is a view showing characteristics of the visco-elastic material used in the embodiment;

DETAILED DESCRIPTION OF THE PREFERRED EMBODIMENT

Figure 1:
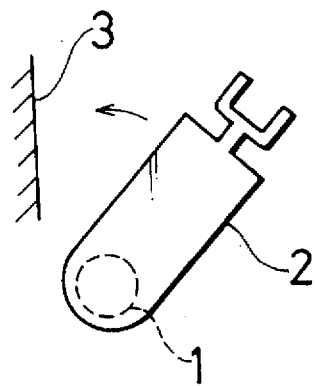
FIG. 1 is a schematic view showing a prior art collision detection technique.
Figure 2:
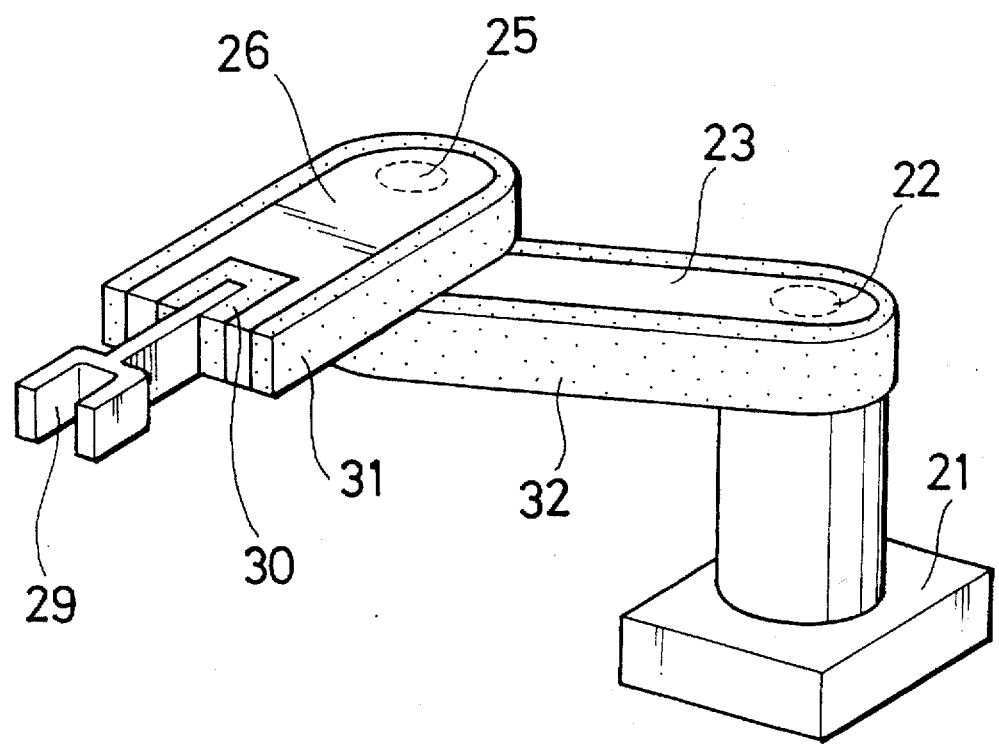
FIG. 2 is a perspective view showing a robot according to an embodiment of the invention.

A preferred embodiment of the invention will now be described. FIG. 2 shows a robot of the embodiment. As shown, the robot has a base 21 to which a first arm 23 can be swiveled in a horizontal plane by a first motor 22. Relative to the end of the first arm 23, a second arm 26 can be swiveled in a horizontal plane by a second motor 25. A hand 29 is mounted on the end of the second arm 26 and serves to perform jobs.

The first arm 23 has its side surfaces covered with a first visco-elastic material 32 for alleviating the degree of impact when the first arm 23 collides with an object. The second arm 26 has its side surfaces covered with a second visco-elastic material 31 for alleviating the impact degree when the second arm 26 collides with an object. A third visco-elastic material 30 is interposed between the second arm 26 and the hand 29 for alleviating the impact degree when the hand 29 collides with an object. The visco-elastic materials may not necessarily be provided on the surface but may be provided inside as well for impact degree alleviation.

The first and the second motors 22 and 25 both have a characteristic that their torque produced and the drive current are substantially proportional. It is thus possible to detect torque by detecting the drive current level. Further, the first and the second motors 22 and 25 each include a rotary encoder from which rotation angle information is available.

Figure 3:
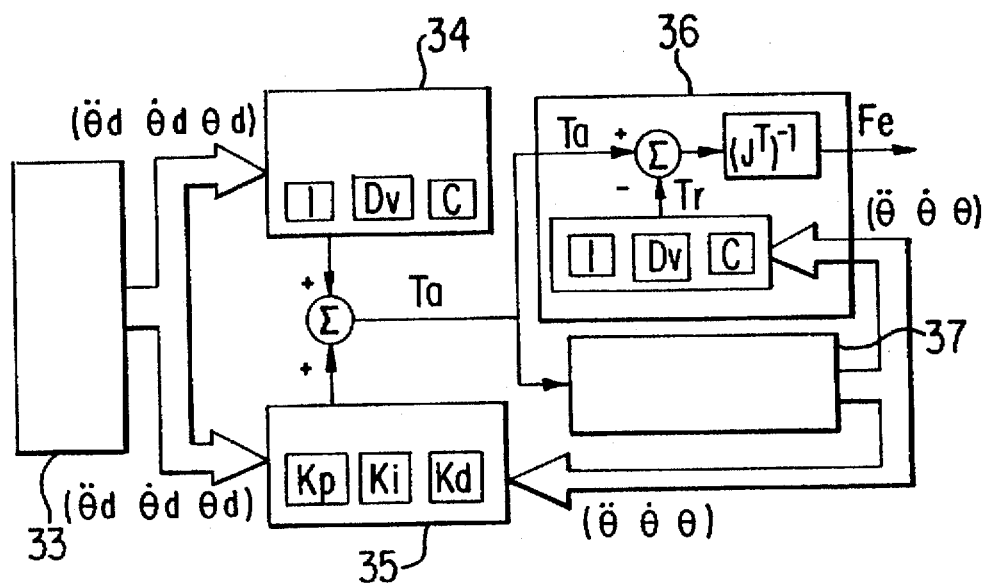
FIG. 3 is a block diagram showing a robot control scheme used in the embodiment.

FIG. 3 shows a control scheme for controlling the robot. Referring to the drawing, designated at 33 are desired values, i.e., desired rotation angle θd(t) of each of the first and the second motors 22 and 25 at a certain instant t as well as angular speed θ̇d and angular acceleration θ̈d at that instant. Designated at 37 is the encoder output of the first and the second motors 22 and 25, i.e., actual rotation angle θ(t), angular speed θ̇d and angular acceleration θ̈d at that instant. Designated at 35 is a feedback controller which feedback controls the first and the second motors 22 and 25 according to the difference between the desired values and the actual values. Shown as Kp, Ki and Kd in the feedback controller 35 are feedback gains for proportional, differential and integral controls, respectively. Designated at 34 is an inverse kinematics processor dealing with inertial moment I, viscosity attenuation coefficient Dv and friction coefficient C of the robot. This processor calculates necessary torques to be produced by the first and the second motors 22 and 25. The output of the processor is variable according to robot orbit plan. Designated at 36 is a processor for calculating external force Fe applied to the robot arm.

Generally, the operation of the robot is expressed as $$I[|\$]\$\ddot{g}\ddot{v}+Dv\dot{\theta}+C(\theta, \dot{\theta})=Ta-J^TFe \quad (1)$$

where Ta is the motor torque, Fe is the external force, and $J^T$ is the transpose of Jacobian matrix.

From the equation (1), the external force Fe is obtained as $$Fe=(J^T)^{-1}(Ta-I[|\$]\$\ddot{g}\ddot{v}-Dv\dot{\theta}-C(\theta, \dot{\theta})) \quad (2)$$

The processor 36 detects the external force on the basis of the equation (2). The individual values on the right side of the equation (2) are determined according to the encoder output level and the motor drive current level. $j^T$, I, Dv and C are measured in advance.

Figure 4:
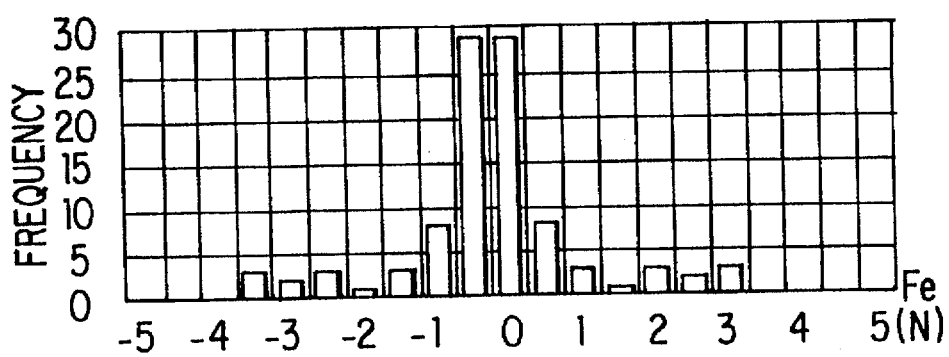
FIG. 4 is a graph showing the external force detection sensitivity of the robot according to the embodiment.

FIG. 4 is a graph showing a relation between the external force calculated from the equation (2) and the frequency of the calculated value measured in an experiment to accelerate and decelerate the second motor 25 while holding the external force Fe of zero with respect to the second arm 26. It is assumed that the calculated external force Fe is applied to a position at a distance of 0.25 m from the center of rotation of the second arm 26. In this case, the calculated external force Fe must always be zero if there is no error. However, it is seen that actually slight errors are introduced. That is, it is seen that errors in the external force calculated on the basis of the equation (2) are no greater than 4.0N, and it is possible to hold the error in the external force detection within 5.0N with a redundancy.

Further, the measuring time that is required for the detection was determined. The delay time involved was found to be around 7/1,000 second. It was confirmed that it is possible to permit detection in a time which is sufficiently short compared to the time described later.

Figure 5:
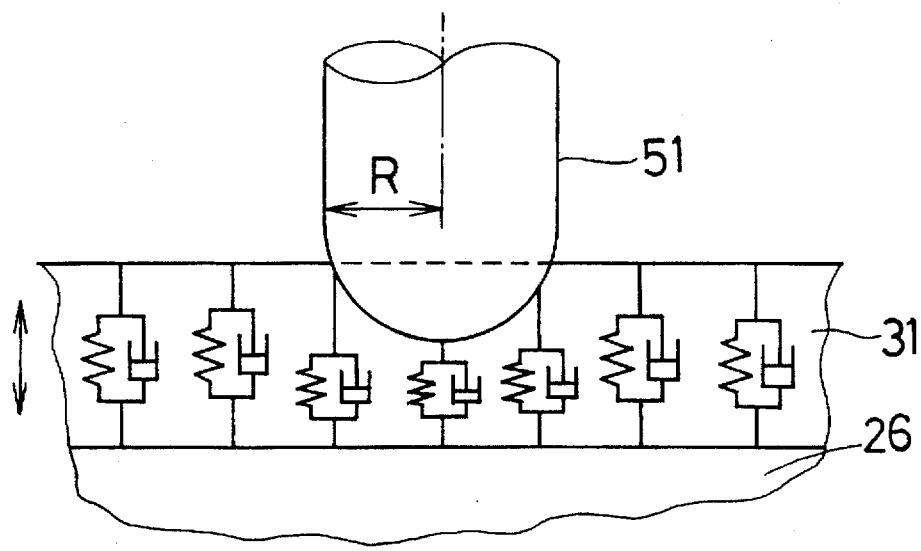
FIG. 5 is a view showing a kinematic model of the relation between an object and a visco-elastic material when the two collide with each other.

FIG. 5 shows a kinetic model of situation when the rotating arm collides with an object 51. The visco-elastic material 31 or like can be handled as a row of large numbers of elastic components and attenuating components.

Here, it is assumed that the object 51 has a half spherical end with radius R, the arm 26 is being moved at constant speed V, and the visco-elastic material 31 has viscosity coefficient q and elasticity coefficient G. In this case, the force F(t) acting on the visco-elastic material 31, i.e., acting between the object 51 and the arm 26, is varied as follows.

During period from the instant (t=R/V) of commencement of collision till the instant (t=R/V) when contact of the entire half sphere with the visco-elastic material 31 is brought about, $$F(t)=(V/R)^2t(2R-Vt)(\eta+Gt) \quad (3)$$

During the period from the instant (t=R/V) till the instant the visco-elastic material reaches the deformation limit thereof, $$F(t)=(\eta V+GR)+GV(t-R/V) \quad (4)$$

Figure 6:
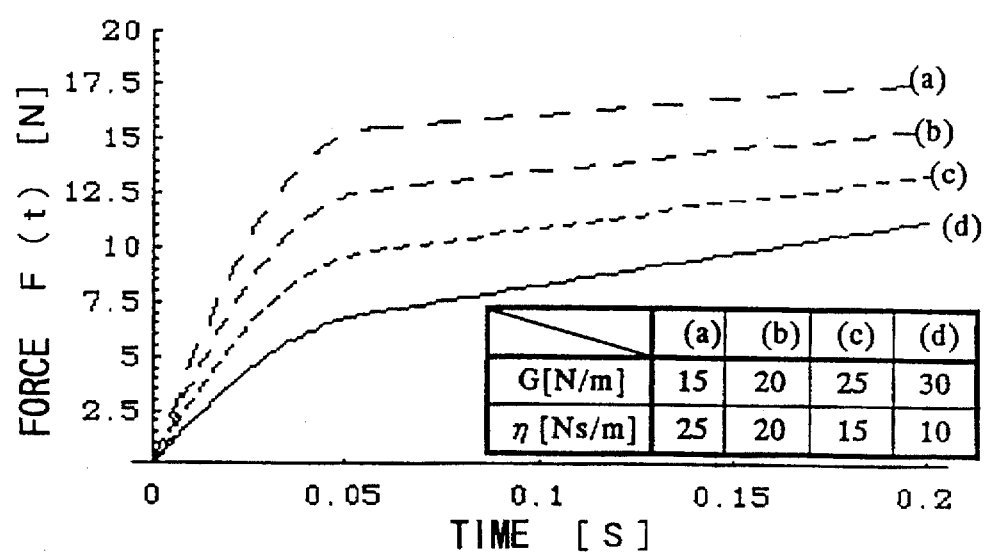
FIG. 6 is a view showing transient status of force acting between the object and the visco-elastic material.

FIG. 6 is a graph showing the force F(t) obtained with the equations (3) and (4) and plotted against time. As is seen, the force F(t) has a trend of sharply increasing initially according to the equation (3) and then increasing gently. With the comparatively sharp increase of the external force in an initial stage of collision, it is possible to detect the collision at an early timing. In a latter stage of collision, on the other hand, the impact is alleviated by the viscosity, so that the external force is not increased so much.

As mentioned above, the minimum external force that can be detected by the robot is 5.0N. Accordingly, it is set that F(t) in the equation (3) is F(t)≧5.0N at the instant t=R/V. By so doing, the robot can detect collision with the object 51 before the contact of the entire half sphere with the visco-elastic material 31 is brought about. To simplify the equation F(t=R/V)≧5.0N, V=0.6 m/sec. and R=0.034 m are substituted into the equation (3), thus obtaining a relation $$5.0N \geq V\eta + 0.6\eta + 0.034G \qquad (5)$$

for the instant t=R/V.

If the condition of the equation (5) is met, the robot can detect collision with the object 51 before the half sphere is buried in the visco-elastic material. The force level with which to compare the external force calculated on the robot side is 5.0N. This order of force level is not a substantial burden on a man's body which the arm may be brought into contact with.

In the controller shown in FIG. 3, if it is determined that the detected external force has exceeded a predetermined level (5.0N), the motor is stopped. Of course, the arm is not immediately stopped at this timing. In this embodiment, the arm is stopped in 0.15 second after commencement of the emergency stop action.

As the worst case, it is considered that the arm is continually moved at constant speed for 0.15 second. In this case, the visco-elastic material is continually compressed. The acting force is thus gradually increased. The force becomes maximum after 0.15 second. The maximum level is determined by substituting t=R/V+0.15 (second) into the equation (4), that is, $$F(t) = V\theta + GR + GV \times 0.15 \qquad (6)$$

This level is the maximum force level which may occur until the arm is stopped after collision of the arm and the object, that is, the maximum level of external force which may act between the arm and the object via the visco-elastic material.

FIG. 7 shows pain-enduring force applied to the back of a man's hand, that is, the level of impact load which is applied to the hand back of a man under test via the visco-elastic material and which can be withstood. It will be seen that the hand back can sufficiently withstand loads up to 30N. This means that so long as the external force F determined with the equation (6) is no higher than 30N, the arm can be stopped before a burden is applied to the hand back due to contact of the arm with the hand back. This condition is expressed by a relation $$30N \geq V\eta + GR + GV \times 0.15 \qquad (7)$$

FIG. 8 shows the ranges of the viscosity coefficient η and the elasticity coefficient G that meet the inequalities (5) and (7). As noted above, V is 0.6 m/sec., and R is 0.035 m. The inequality (5) indicates that the collision detection timing is delayed excessively if the visco-elastic material is excessively soft. The inequality (7), on the other hand, indicates that if the material is excessively hard, the impact degree can not be sufficiently attenuated.

In FIG. 8, if a visco-elastic material having viscosity coefficient η and elasticity coefficient G which are both permissible does not exist, this technique can not be realized. However, as shown in FIG. 9, among urethane foams and silicon gels, there are materials which meet the above requirements. It has been confirmed that by selecting a visco-elastic material having such a characteristic, despite of the fact that the collision detection timing is delayed due to impact degree alleviation, it is possible to stop the arm by emergency stopping before commencement of acting of such an external force as to cause a burden on the man's body. The intelligence that by selecting visco-elastic materials having specific characteristics, it is possible to overcome the technical dilemma or relation of opposing factors that alleviation of impact degree results in a delay of the collision detection timing although it is desired to alleviate the impact degree, has been found for the first time according to the invention.

Figure 10:
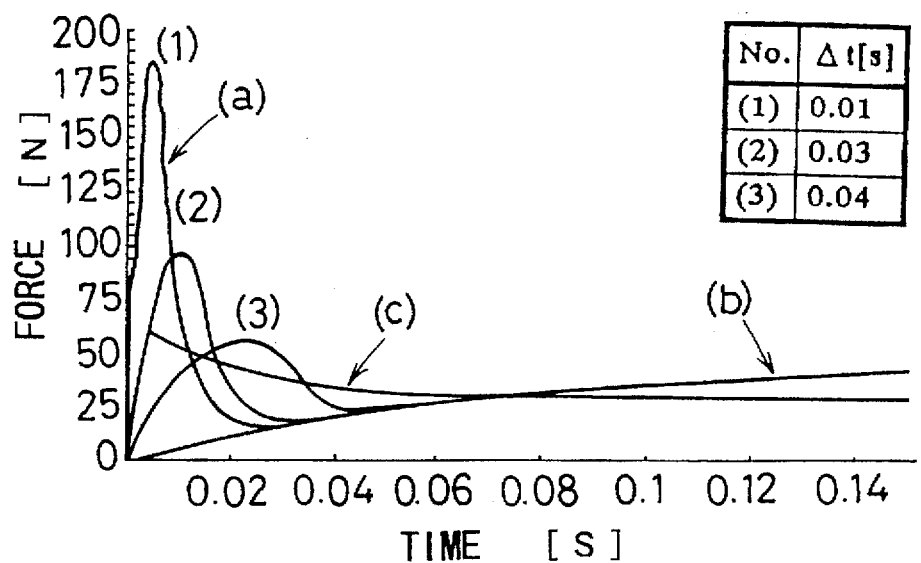
FIG. 10 is a graph showing force acting between an arm and an object when forced stopping action is not given.

FIG. 10 shows transient characteristics when robot having a capacity of 50N collides at a speed of V=0.6 m/sec. Here, the effective mass at the time of the collision is 3 kg. In the drawing, curve (1) is obtained in case with a collision time of 0.01 second. In this case, the arm is not covered. Curves (2) and (3) are obtained in cases with collision times of 0.03 and 0.04 second, respectively. In these cases, the arm is covered with a visco-elastic material. The above curves are obtained without taking any emergency stopping action. Without taking any emergency stopping action, the force with which the arm pushes the man's body is increased to ultimately become a level which can not be withstood even through the arm is covered with a visco-elastic material. Curve (c) shows the force level which can be withstood by the man's body. Curve (b) represents the motor torque.

Figure 11:
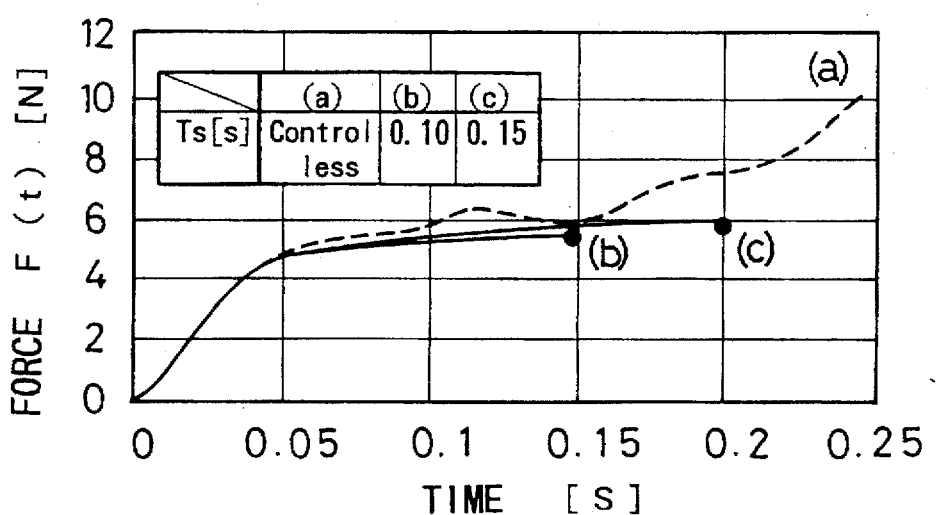
FIG. 11 is a graph showing force acting between an arm and an object when forced stopping action is given.

FIG. 11 shows force in case in which the arm is covered with a visco-elastic material satisfying the characteristics shown in FIG. 8, and also in which the emergency stopping action is executed. In the drawing, shown by (a) is a measured force level in case of taking no emergency stopping action, by (B) a level in case when a delay time of 0.10 second is generated before stopping, and by (c) a level in case when a delay time of 0.15 second is generated before stopping.

The curves shown in FIG. 6 which are obtained with the equation (4), are based on the assumption that constant speed motion is continued during the emergency halt time as well. On the other hand, FIG. 11 shows measured levels. Actually, the arm speed V is gradually reduced after the emergency stopping. Thus, the force acting between the object and the arm is not increased so much.

As is seen from FIG. 11, by combining the visco-elastic material and the emergency stopping action, it is possible to stop the arm before a burden is applied to the man's body.

Figure 12:
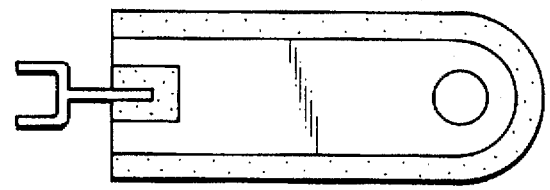
FIG. 12 is a view showing an example of the scope of application of the invention.
Figure 13:
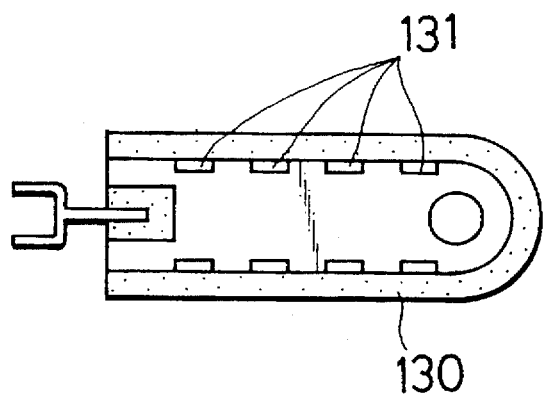
FIG. 13 is a view showing another example of the scope of application of the invention.
Figure 14:
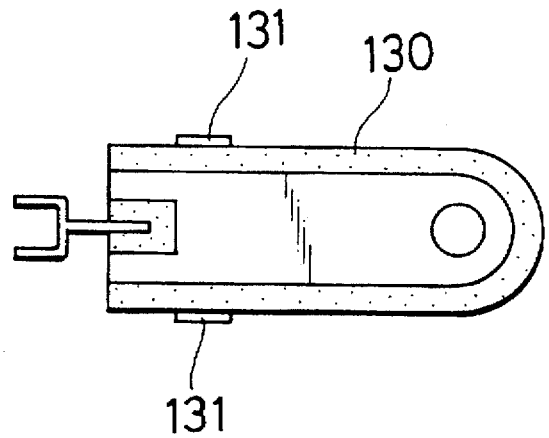
FIG. 14 is a view showing a further example of the scope of application of the invention.

In the embodiment described so far, as shown in FIG. 12, the external force is detected from information of the torque applied to the motor, rotation angle, angular speed and angular acceleration. Alternatively, as shown in FIGS. 13 and 14, it is possible to detect the external force directly with pressure sensors 131. In these cases, the force detected by the pressure sensor again has been alleviated by the visco-elastic material 130. Usually, therefore, it is thought that the collision detection timing is delayed. However, by appropriately selecting the visco-elastic material, it is possible to avoid excessive delay of the collision detection timing while obtaining impact degree alleviation.

The substitution of F(t=R/V)≧5.0N into the equation (3) is only one way of solution. Generally, denoting the robot side external force detection sensitivity by N1 and the arm or object side minimum pain-enduring force (permissible force) by N2, the timing t1 corresponding to F(t)=N1 is obtained from the equation (3), and then t=t1+t2 (t2 being time until the arm is actually stopped after commencement of forced or emergency stopping action) is substituted into the equation (4), thereby obtaining the viscosity coefficient η and the elasticity coefficient G corresponding to (t=t1+t2) =N2 at that instant. In a special case, the timing t1 corresponding to F(t)=N1 may be obtained from the equation (4). In either case, while securing impact degree alleviation, the collision detection timing is not excessively delayed, and by subsequently taking the forced or emergency stopping action, the arm can be stopped before a force in excess of the permissible level turns to act between the arm and the object.

As has been described in the foregoing, according to the invention, it is possible to overcome the opposite factor relation between the technique of alleviating the degree of impact generated between the arm and the object and the technique of stopping the arm at an early timing by detecting the collision at an early timing. Thus, while securing impact degree alleviation, the collision detection timing is not excessively delayed, and the arm can be stopped before the force acting between the object and the arm exceeds a permissible level. In effect, it is thus possible to effectively prevent damage to the arm and the object. Further, it is possible to adopt the pain-enduring force of the man's body as the permissible value. By so doing, it is possible to permit the robot and the man to work together safely.

What is claimed is:

1. A robot having an arm and an arm driver to move the arm, a surface of the arm subject to collision with an object, the robot comprising a detector for detecting a magnitude of an external force applied to the arm and forcibly stopping the arm driver when the detected magnitude of the external force exceeds a predetermined level, wherein the surface of the arm is covered with a visco-elastic material, wherein the visco-elastic material has a viscosity coefficient and elasticity coefficient, such that the magnitude of the external force acting on the visco-elastic material is less than a permissible level at an instant after lapse of the sum of times t1 and t2, where the permissible level does not cause damage to the arm and the object and time t1 is measured from the instant when the visco-elastic material is brought into contact with the object until the instant the magnitude of the detected external force reaches the predetermined level acting on the visco-elastic material and time t2 is measured from the instant of starting the stopping operation of the arm driver until the instant when the arm is stopped, and the external force acting on the object is $F(t)=(\eta V+GR)+GV(t-R/V)$, where F(t) is the external force, η is the viscosity coefficient and G is the elasticity coefficient of the visco-elastic material, R is a radius of a half spherical end of the object, and V is a speed of the arm; and wherein the predetermined level is at a force F(t) =5.0N and the permissible level is at a force F(t)=30.0N, further wherein at t=R/V, R=0.034 m and V=0.6 m/sec and the viscosity coefficient η and the elasticity coefficient G satisfy the following conditions:

$$5.0N \leq V\eta + 0.6\eta + 0.034G, \text{ and at } t=R/V+0.15:$$

$$30N \geq V\eta + GR + GV \times 0.15.$$

* * * * *